(No Model.)

A. WILKIN.
Tire Tightener.

No. 239,901. Patented April 5, 1881.

Witnesses:
T. Walter Fowler.
Jno. L. Condron.

Inventor:
Alfred Wilkin
per attys.
A. H. Evans & Co

UNITED STATES PATENT OFFICE.

ALFRED WILKIN, OF PALMER, MISSOURI.

TIRE-TIGHTENER.

SPECIFICATION forming part of Letters Patent No. 239,901, dated April 5, 1881.

Application filed October 20, 1880. (No model.)

*To all whom it may concern:*

Be it known that I, ALFRED WILKIN, of Palmer, county of Washington, State of Missouri, have invented a new and Improved Felly-Expander; and I hereby declare the following to be a full, clear, and exact description thereof, reference being had to the accompanying drawings, in which—

Figure 1:
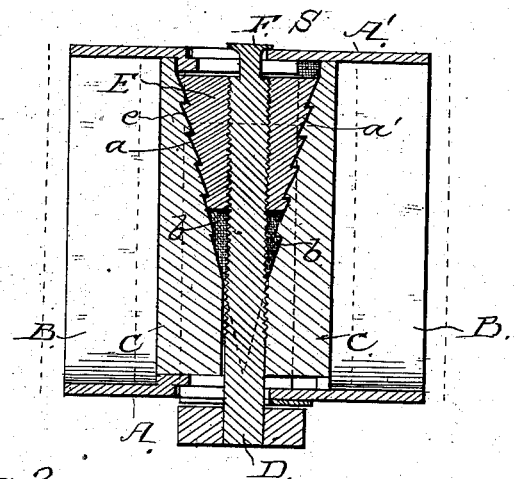
Figure 2:
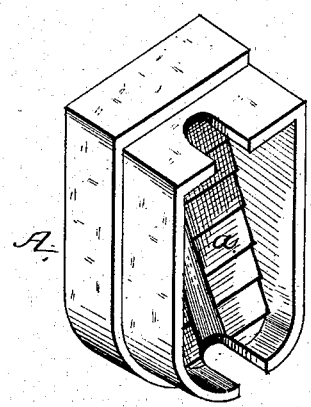
Figure 3:
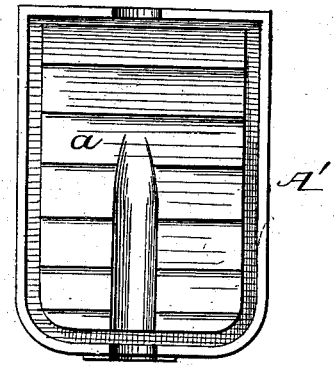
Figure 4:
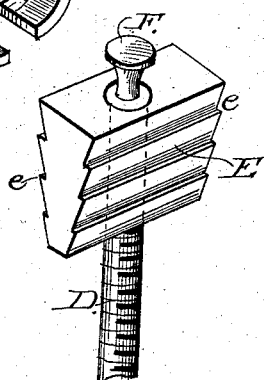

Figure 1 is a longitudinal sectional view of the expander applied. Figs. 2, 3, and 4 are details to be referred to.

The object of my invention is to provide a felly-expander which has no unsightly projecting parts on the inner rim of the wheel; and my invention consists of certain details of construction, as hereinafter described and claimed.

In order that those skilled in the art may make and use my invention, I will proceed to describe the manner in which I have carried it out.

In the said drawings, A A' are two telescoping metallic ferrules, provided with recesses B B, into which fit the ends of the felly-sections C C. These ferrules are provided with diagonal toothed faces *a a*, which arrangement leaves a wedge-shaped opening, *b*, when the ferrules are fitted together. An endless screw, D, carrying an elongated nut, E, having diagonal toothed edges *e e*, the incline of the said edges corresponding with the incline of the toothed faces *a a*, is fitted through the ferrules, as shown, so that it has a bearing, S, in the upper plate of ferrule A' and a projecting head, F, on the inner side of the felly, whereby the said screw D may be turned.

The operation is as follows: When the wheel is constructed the device is inserted at the joint with the ferrules, telescoping as far as possible, and with the nut E at the top of the opening *b*. When the felly needs tightening the screw D is turned, and the nut E travels toward the head of the screw and forces the ferrules apart, and with them the felly-sections. As the nut E travels along the faces *a a* of the ferrules the teeth on its edges ride over the teeth on the faces *a a*, the teeth interlocking when the nut is stationary, so as to prevent it being moved back toward the tire by jar or vibration. The expansion of the fellies caused by forcing apart the ferrules tightens the joints of the wheel and expands it so as to tightly fit the tire.

Having thus described my invention, what I claim as new, and desire to secure by Letters Patent, is—

A felly-expander consisting of the two telescoping ferrules A A', provided with the toothed diagonal faces *a a*, in combination with the endless screw D, having bearings within the telescoping ferrules, and nut E, having toothed diagonal edges *e e*, substantially as and for the purpose set forth.

ALFRED WILKIN.

Witnesses:
SAMUEL LONG, Jr.,
WM. J. HURT.